(12) United States Patent
Park et al.

(10) Patent No.: US 9,015,273 B2
(45) Date of Patent: Apr. 21, 2015

(54) METHODS AND DEVICES FOR TRANSMITTING AND RECEIVING SEQUENTIAL CONTENT IN A CONTENT CENTRIC NETWORK

(75) Inventors: Joong Hong Park, Seoul (KR); Jae Hoon Kim, Yongin-si (KR); Byoung Joon Lee, Seongnam-si (KR); Myeong Wuk Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 13/565,231

(22) Filed: Aug. 2, 2012

(65) Prior Publication Data

US 2013/0041979 A1    Feb. 14, 2013

(30) Foreign Application Priority Data

Aug. 8, 2011    (KR) .................. 10-2011-0078623

(51) Int. Cl.
*H04L 12/18* (2006.01)
*H04N 21/4788* (2011.01)
*H04L 29/08* (2006.01)

(52) U.S. Cl.
CPC ........ *H04L 12/1859* (2013.01); *H04N 21/4788* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 2002/0059499 A1* | 5/2002 | Hudson | 711/118 |
| 2008/0288983 A1* | 11/2008 | Johnson et al. | 725/46 |
| 2009/0287835 A1 | 11/2009 | Jacobson | |
| 2010/0325666 A1* | 12/2010 | Wiser et al. | 725/44 |

FOREIGN PATENT DOCUMENTS

| | | |
|---|---|---|
| EP | 2214357 A1 | 8/2010 |
| JP | 2009-277234 A | 11/2009 |
| JP | 2009-2844832 A | 12/2009 |
| KR | 10-0478345 B1 | 3/2005 |
| KR | 10-2009-0129678 A | 12/2009 |

* cited by examiner

*Primary Examiner* — Mohamed Ibrahim
(74) *Attorney, Agent, or Firm* — NSIP Law

(57) ABSTRACT

Provided is a scheme of transmitting sequential content (or data) in a content centric network (CCN). The scheme includes a push scheme which may reduce a load on a network and inefficiency of a transmission that results from a constant transmission of a content request message between devices.

16 Claims, 13 Drawing Sheets

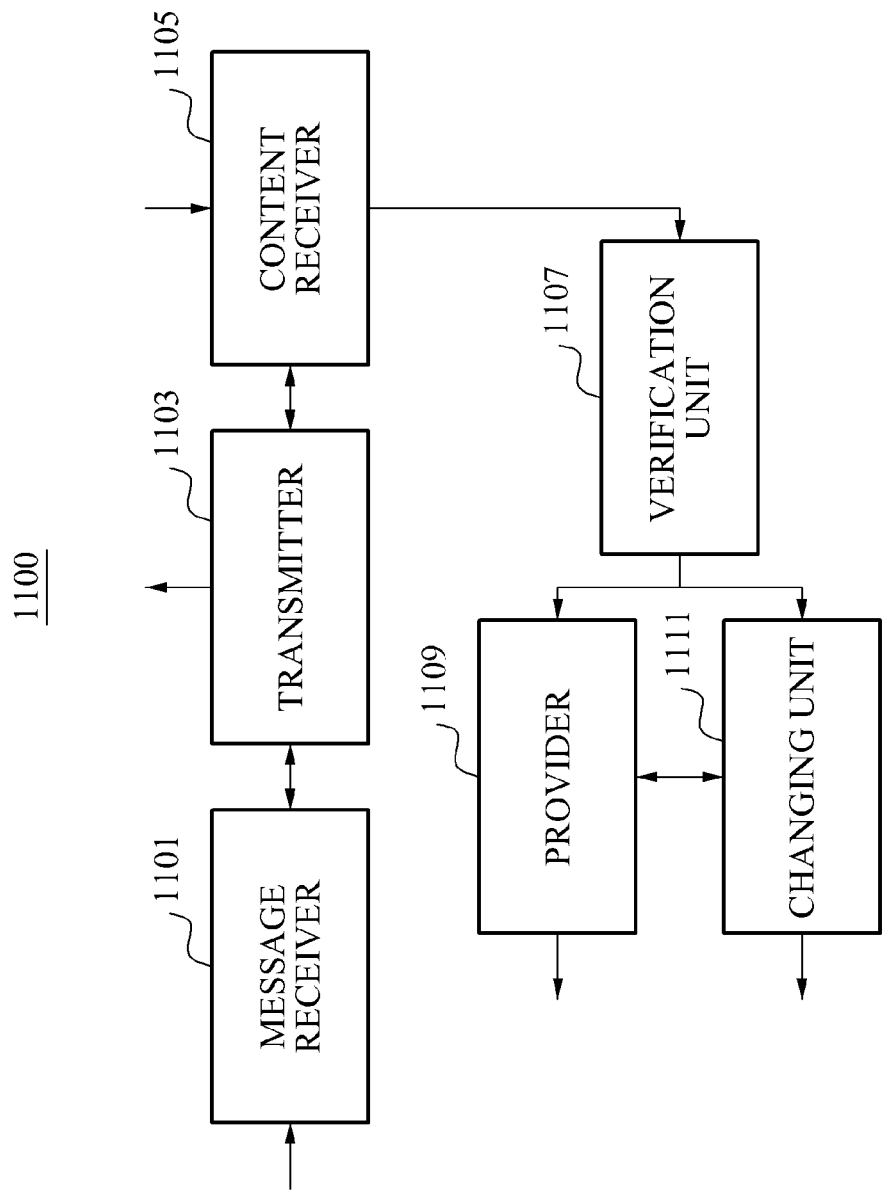

METHODS AND DEVICES FOR TRANSMITTING AND RECEIVING SEQUENTIAL CONTENT IN A CONTENT CENTRIC NETWORK

CROSS-REFERENCE TO RELATED APPLICATION(S)

This application claims the benefit under 35 U.S.C. §119 (a) of Korean Patent Application No. 10-2011-0078623, filed on Aug. 8, 2011, in the Korean Intellectual Property Office, the entire disclosure of which is incorporated herein by reference for all purposes.

BACKGROUND

1. Field

The following description relates to methods and devices for transmitting and receiving sequential content in a content centric network.

2. Description of Related Art

In contrast to an Internet protocol (IP) in which content may be obtained from an original possessor, a content centric network (CCN) allows a node at an intermediate position to reply to a content requester when the node stores the corresponding content. The CCN may have a "content request→content (or data) transmission" structure in which a node having the content, for example, a terminal, a relay, and the like, transmits the content, in response to a user transmitting a request for content.

Various services provided via the Internet may be provided in a CCN environment. For example, services such as a text chat, a voice chat, a movie file, and the like, may be provided using a successive data transmission. In this example, sequential content may be exchanged between nodes, in chronological order to support the services.

To exchange sequential content in the CCN environment, content may be requested through a prefix of a node providing sequential content (or data). However, the scheme may involve constantly transmitting a message that requests content regardless of whether desired content exists. Accordingly, the corresponding scheme may be inefficient and may increase a load of a network.

SUMMARY

In one general aspect, there is provided a method of transmitting sequential content by a content transmission device in a content centric network (CCN), the method including preparing sequential content to be transmitted from the content transmission device to a content reception device, transmitting, to the content reception device, at least one push request message comprising an indicator indicating that content is to be transmitted based on a push scheme, receiving, from the content reception device, at least one content request message requesting the sequential content, in response to the at least one push request message, and transmitting the sequential content to the content reception device.

The preparing may comprise generating a hierarchical name of the sequential content.

The generating may comprise inserting, into the hierarchical name of the sequential content, an indicator indicating that the content that is to be transmitted to the content reception device includes sequential content.

The generating may comprise inserting, into the hierarchical name of the sequential content, a time indicator comprising time information of the sequential content.

The method may further comprise generating the at least one push request message using the hierarchical name of the sequential content.

The generating of the at least one push request message may comprise generating the at least one push request message by adding information about the content reception device to the hierarchical name of the sequential content.

The hierarchical name of the sequential content may comprise at least one of information about a group including a content transmission device generating the sequential content, a file name of the sequential content, and information about an attribute of the sequential content.

The method may further comprise receiving, from the content reception device, a response message corresponding to a response to the transmitted sequential content.

In another aspect, there is provided a method of receiving sequential content by a content reception device in a content centric network (CCN), the method including receiving, from a content transmission device, at least one push request message comprising an indicator indicating that content is to be transmitted based on a push scheme, transmitting at least one content request message requesting the sequential content, in response to the at least one push request message, and receiving the sequential content from the content transmission device.

The sequential content may comprise a hierarchical name including at least one of information about a group including a content transmission device generating the sequential content, a file name of the sequential content, and information about an attribute of the sequential content.

The method may further comprise generating the at least one content request message using a hierarchical name of the sequential content.

The method may further comprise verifying whether a first content and a second content of the sequential content are received in chronological order of a transmission.

The method may further comprise changing an order of the first content and the second content in a lower level layer of the content reception device, in response to the first content and the second content being received out of order in the transmission, and providing the first content and the second content having a changed order to a higher level layer of the content reception device.

The changing may comprise changing the order of the first content and the second content based on time indicators comprising time information of each of the first content and the second content, and based on hierarchical names of each of the first content and the second content.

The method may further comprise providing the first content and the second content to a higher level layer of the content reception device from a lower level layer of the content reception device, in response to the first content and the second content being received out of order in the transmission, and changing an order of the first content and the second content in the higher level layer of the content reception device.

The changing may comprise changing the order of the first content and the second content based on time indicators comprising time information of each of the first content and the second content, and based on hierarchical names of each of the first content and the second content.

In another aspect, there is provided a non-transitory computer-readable storage medium having stored therein program instructions to cause a processor to implement a method of transmitting sequential content by a content transmission device in a content centric network (CCN), the method including preparing sequential content to be transmitted from the content transmission device to a content reception device, transmitting, to the content reception device, at least one push request message comprising an indicator indicating that content is to be transmitted based on a push scheme, receiving, from the content reception device, at least one content request message requesting the sequential content, in response to the at least one push request message, and transmitting the sequential content to the content reception device.

In another aspect, there is provided a content transmission device in a content centric network (CCN), the content transmission device including a message transmitter configured to transmit, to a content reception device, at least one push request message comprising an indicator indicating that content is to be transmitted based on a push scheme, a receiver configured to receive, from the content reception device, at least one content request message requesting sequential content, in response to the at least one push request message, and a content transmitter configured to transmit the sequential content to the content reception device.

The content transmission device may further comprise a generator configured to generate a hierarchical name of the sequential content.

In another aspect, there is provided a content reception device in a content centric network (CCN), the content reception device including a message receiver configured to receive, from a content transmission device, at least one push request message comprising an indicator indicating that content is to be transmitted based on a push scheme, a transmitter configured to transmit at least one content request message requesting sequential content, in response to the at least one push request message, and a content receiver configured to receive the sequential content from the content transmission device.

Other features and aspects will be apparent from the following detailed description, the drawings, and the claims.

BRIEF DESCRIPTION OF THE DRAWINGS

FIG. 11 is a diagram illustrating an example of a content reception device.

Figure 1A:
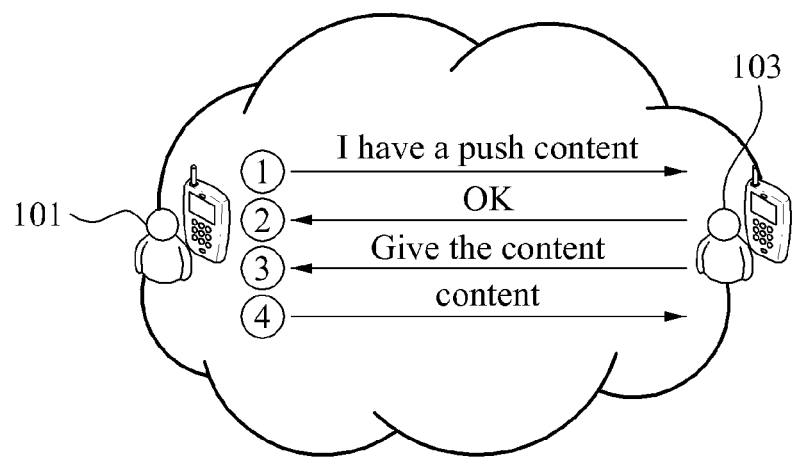
FIGS. 1A through 1C are diagrams illustrating examples of transmitting content by a push scheme in a content centric network (CCN).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Typically content is transmitted in a content centric network (CCN) using a pull scheme. In a pull scheme, a receiver constantly requests content to be exchanged using a content request message, and receives the content at a point in time when the content exists. However, the pull scheme involves constantly transmitting wasteful content request messages (or interests) into a network in a state in which the receiving node is unaware of when desired content is available. Further, constantly transmitting content request messages for each type and number of sequential contents may increase inefficiency and a load of a network significantly.

In the pull scheme, a generated content may not be properly received when a network delay occurs. For example, if a network delay occurs during an exchange of content between several devices, each device may fail to properly receive content.

Thus, according to various examples herein, a push scheme may be implemented to reduce a failure in receiving content properly, for example, due to a network delay, while also reducing a number of wasteful transmissions of content request messages.

Figure 1B:
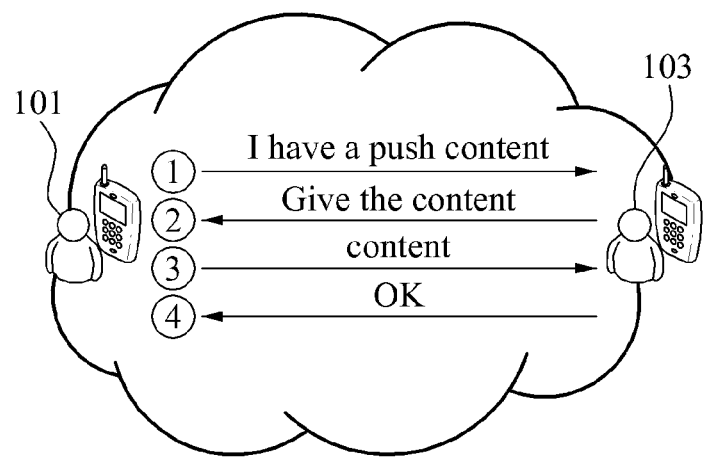
Figure 1C:
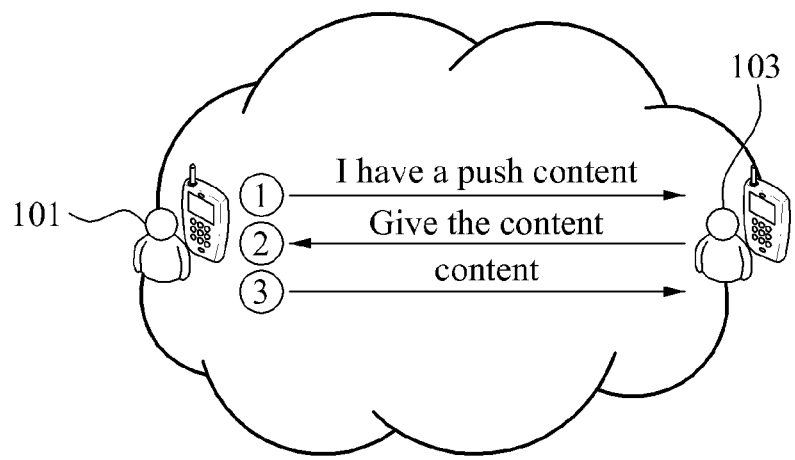

FIGS. 1A through 1C illustrate an example of transmitting content by a push scheme in a content centric network (CCN).

FIG. 1A illustrates an example of a 4-way push scheme using four operations including a Push request, an OK response, a Content request, and a Content transmission. FIG. 1B illustrates an example of a 4-way push scheme using four operations including a Push request, a Content request, a Content transmission, and an OK response. FIG. 1C illustrates an example of a 3-way push scheme using three operations including a Push request, a Content request, and a Content transmission.

For example, referring to FIG. 1B, "① I have a push content" may be an operation in which a content transmission device 101 informs a content reception device 103 that sequential content is to be transmitted, and may correspond to a push request message. The content reception device 103 receiving the push request message from the content transmission device 101 may request sequential content such as "② Give the content" in response to the push request message. In this example, "② Give the content" may correspond to a content request message, that is, an interest in the content.

The content transmission device 101 may transmit sequential content to the content reception device 103, which corresponds to "③ content." Thereafter, the content reception device 103 may transmit a confirmation response to the content transmission device 101 reporting a successful transmission of sequential content, which corresponds to "④ OK."

The 4-way push scheme of FIG. 1B may achieve a stable content exchange by transmitting, by the content reception device 103, a confirmation response to the content transmission device 101. In various examples herein, a transmission of sequential content between a content transmission device and a content reception device is described based on the 4-way push scheme.

Figure 2:
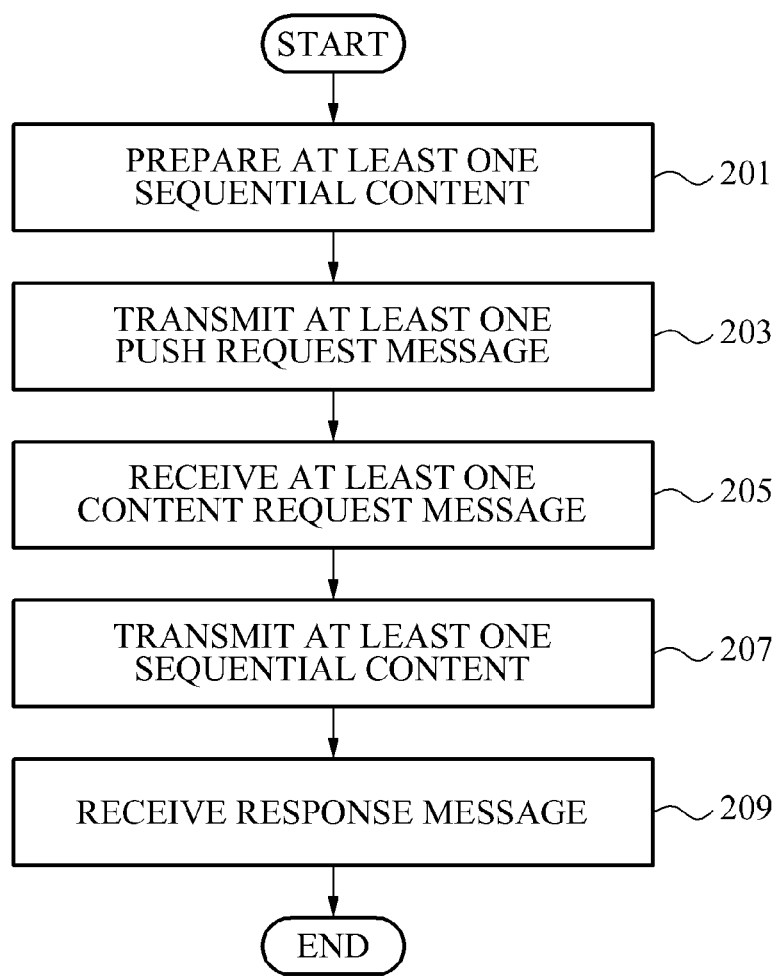
FIG. 2 is a flowchart illustrating an example of a method of transmitting sequential content by a content transmission device.

FIG. 2 illustrates an example of a method of transmitting sequential content by a content transmission device. FIG. 2 is example of a method of transmitting sequential content by the content transmission device in a CCN including at least one content transmission device and at least one content reception device.

Referring to FIG. 2, in 201, the content transmission device prepares at least one sequential content to be transmitted from the content transmission device to the at least one content reception device. For example, the preparing of the at least one sequential content may include several operations as described herein.

In the CCN, metadata such as a name or a hierarchical name of desired content, information about an attribute of content, and the like, may be inserted into or as message delivering requirements of a user. In this example, an interest, an intent, a request, and the like, may be given as an example of the message delivering requirements of a user. The information about an attribute of content may include a format of content, a size of content, a creator (or maker) of content, a generated date of content, and the like.

In 201, the content transmission device may locate content stored in an internal or external source, and then insert the metadata, and the like, into the content, thereby generating sequential content transmissible in the CCN. For example, a hierarchical name for sequential content may be generated. An example of method of preparing, by the content transmission device, the at least one sequential content is described with reference to FIG. 3.

In 203, the content transmission device transmits at least one push request message to at least one content reception device. For example, the at least one push request message may include an indicator (or command), for example, "%PUSH" indicating that content is to be transmitted to the at least one content reception device based on the push scheme.

Prior to the transmission of the at least one push request message, the content transmission device may generate the at least one push request message. For example, the content transmission device may generate the at least one push request message by adding, to the hierarchical name of the at least one sequential content, information about the at least one content reception device receiving the at least one push request message. An example of a method of generating the at least one push request message is described with reference to FIG. 5.

In 205, the content transmission device receives, from the at least one content reception device, at least one content request message requesting the at least one sequential content.

In 207, the content transmission device transmits the at least one sequential content to the at least one content reception device.

In 209, the content transmission device receives, from the at least one content reception device, at least one response message corresponding to a response to the at least one sequential content.

Figure 3:
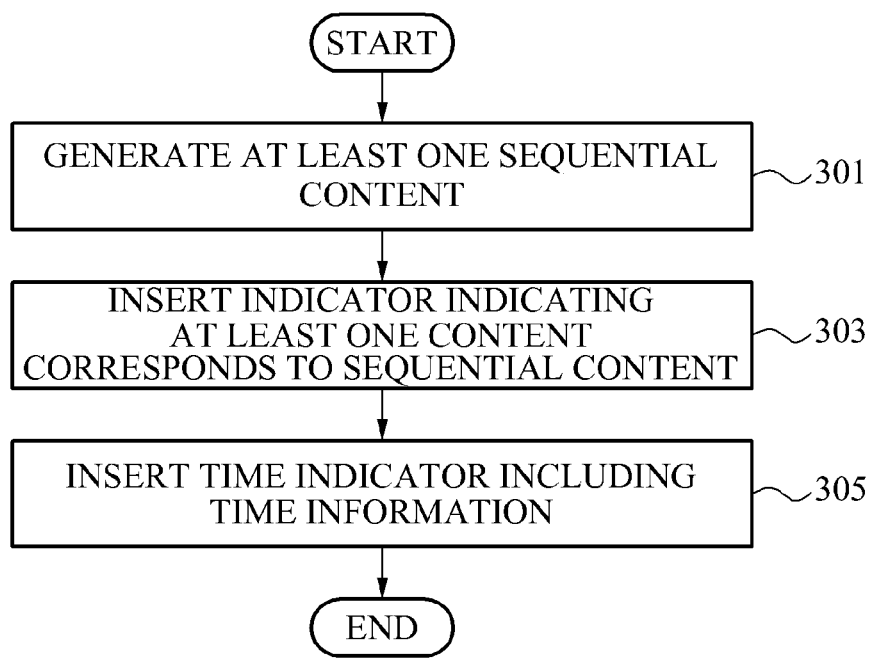
FIG. 3 is a flowchart illustrating an example of a method of preparing sequential content in a content transmission device.

FIG. 3 illustrates an example of a method of preparing at least one sequential content in a content transmission device.

Referring to FIG. 3, in 301, the content transmission device generates a hierarchical name of the at least one sequential content. For example, the hierarchical name of the at least one sequential content may include at least one of information about a group including a content transmission device generating the at least one sequential content, a file name of the at least one sequential content, information about an attribute of the at least one sequential content, and the like.

In 303, the content transmission device inserts an indicator into the hierarchical name of the at least one sequential content. For example, the indicator may be "_CHAT_," "_STREAM_," and the like indicating that the at least one content that is to be transmitted to the at least one content reception device corresponds to sequential content.

In 305, the content transmission device inserts a time indicator into the hierarchical name of the at least one sequential content. The time indicator includes time information of the at least one sequential content. For example, if the time information corresponds to A or 04D7828F22, the time indicator may be in a form of "%TIME_A" or "%TIME_04D7828F22."

As an example, the content transmission device may obtain the time information from a system, and may use the time information by converting it into a predetermined format, for example, 04D7828F22, or may generate the time information in another form, for example, serial numbers 1, 2, 3, . . . or symbols A, B, C, . . . predetermined between users such as a content transmission device and a content reception device.

As previously described, sequential content may be delivered out of order. The time information of the sequential content may be used as a component of a hierarchical name of sequential content. The time information may be used to change an order of sequential content that is delivered out of order into a proper order. An order of inserting a time indicator or an indicator indicating that sequential content may not be limited to the example described in the herein. For example, after generating a hierarchical name of at least one sequential content, the time indicator and the indicator may both be inserted into the hierarchical name first.

Figure 4:
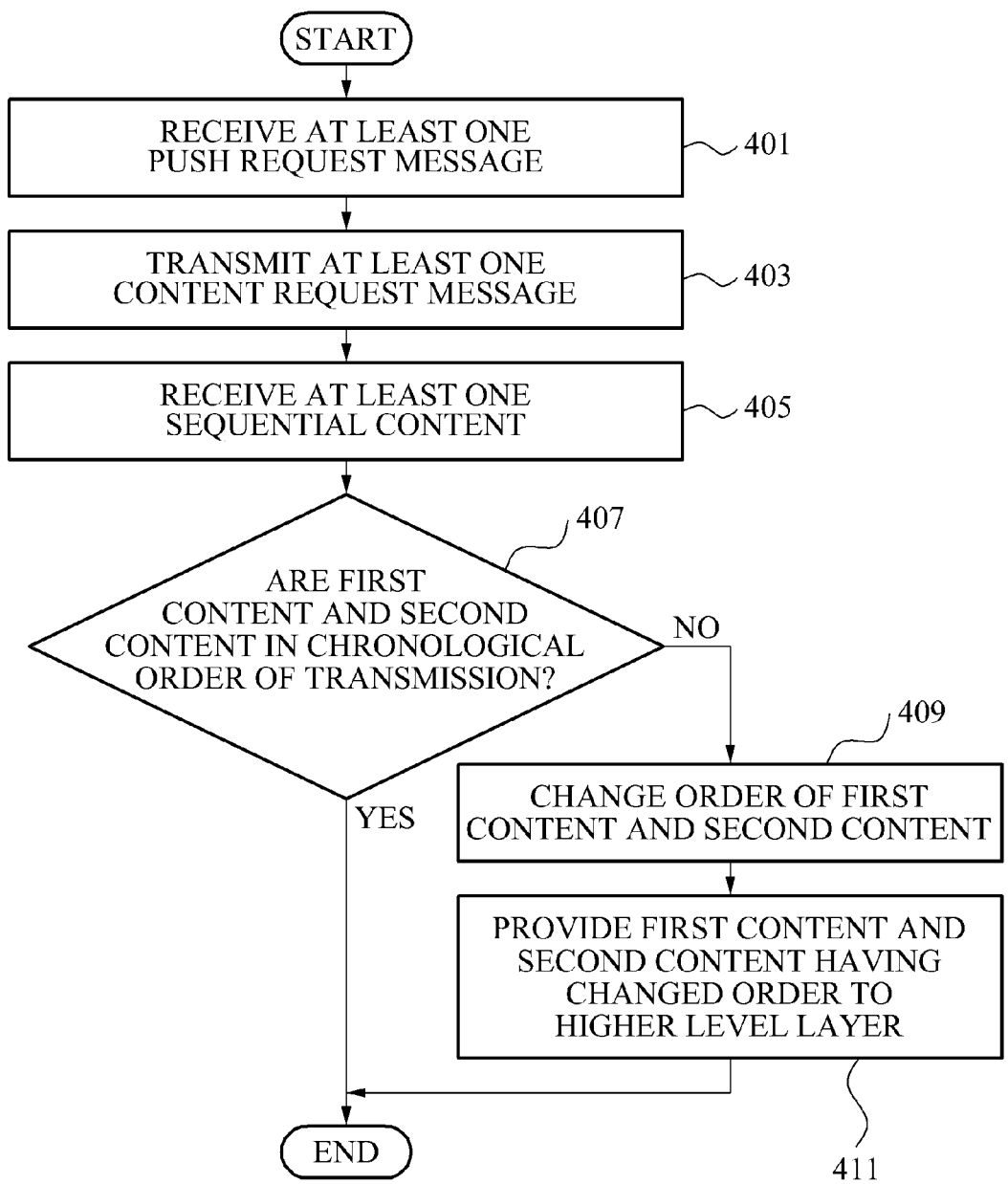
FIG. 4 is a flowchart illustrating an example of a method of receiving sequential content by a content reception device.

FIG. 4 illustrates an example of a method of receiving sequential content by a content reception device. FIG. 4 is an example of a method of receiving sequential content by the content reception device in a CCN including at least one content transmission device and at least one content reception device.

Referring to FIG. 4, in 401, the content reception device receives at least one push request message from the at least one content transmission device. For example, the at least one push request message may include an indicator (or command), for example, "%PUSH" reporting that content is to be transmitted from the at least one content reception device based on the push scheme.

In 403, the content reception device transmits at least one content request message requesting the sequential content, in response to the at least one push request message. For example, prior to the transmission of the at least one content request message, the content reception device may generate the at least one content request message using a hierarchical name of the sequential content. The hierarchical name of the sequential content may be included in the at least one push request message received in 401.

In 405, the content reception device receives at least one sequential content from the at least one content transmission device. The at least one sequential content may have a hierarchical name. For example, the hierarchical name may include at least one of information about a group including a content transmission device generating the at least one sequential content, a file name of the at least one sequential content, and information about an attribute of the at least one sequential content.

In 407, the content reception device determines whether a first content and a second content corresponding to the sequential content, received from the at least one content transmission device, are received in chronological order of a transmission. In this example, the at least one sequential content may refer to sequential content received each time a packet is transmitted. If the content is received in chronological order, the method may repeat or it may end.

For example, a content transmission device A may transmit a first content as sequential content when a first packet is transmitted, and transmit a second content as sequential content when a second packet is transmitted. The content reception device receiving each sequential content may determine whether the first content and the second content are received in chronological order of a transmission.

Figure 7:
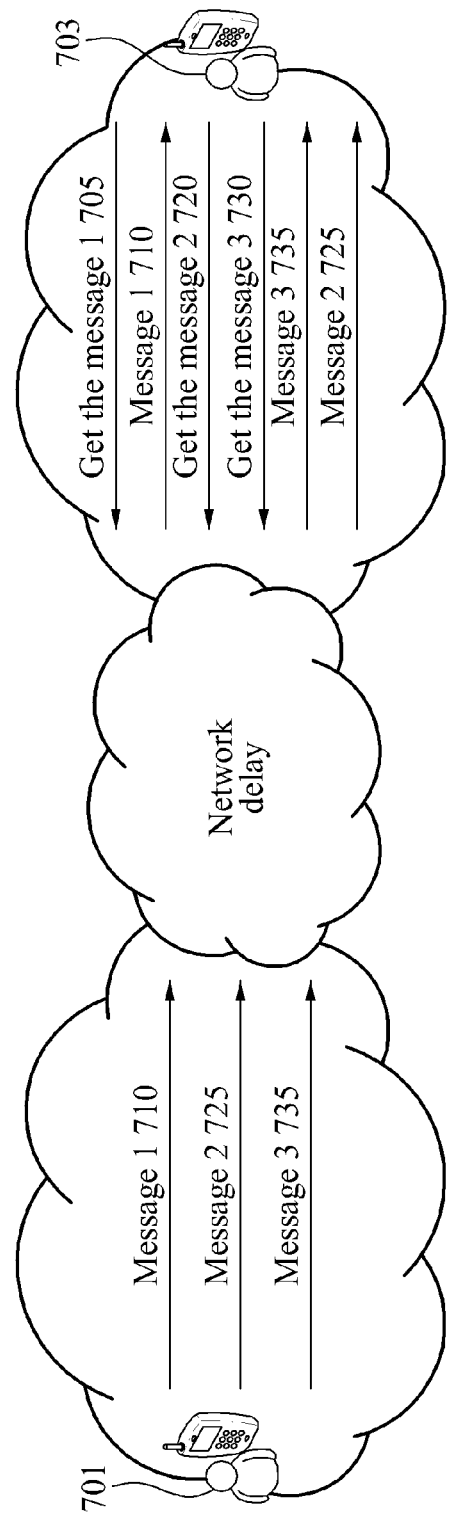
FIG. 7 is a diagram illustrating an example of sequential content (or data) being exchanged between a content transmission device and a content reception device that is received out of order in a transmission in a CCN.

Referring to FIG. 7, content transmitted by the content transmission device may be out of order in a transmission, for example, due to a delay resulting from an unstable network. Thus, the content reception device determines whether content is received out of order in a transmission in 407. If the first content and the second content are received out of order in a transmission in 407, the content reception device may correct the order using multiple schemes. Described herein are examples of a first scheme and a second scheme for ease of description and may not be construed as being limited thereto.

The first scheme is described below.

In 409, in response to the first and second content not being received in the correct order, the content reception device changes an order of the first content and the second content in a lower level layer of the content reception device. The content reception device may change the order of the first content and the second content based on time indicators including information about a point in time each of the first content and the second content are transmitted, and based on hierarchical names of each of the first content and the second content. In this example, the lower level layer of the content reception device may correspond to a CCN layer or a layer that has a higher level than a level of the CCN layer.

Thereafter, in 411, the content reception device provides the first content and the second content having the changed order to a higher level layer of the content reception device. For example, the higher level layer of the content reception device may correspond to an application layer.

An example of correcting an order of content using a first scheme is described with reference to FIG. 8.

The second scheme is described below.

As another example, in 409, in response to the first content and the second content being received out of order in a transmission, the content reception device may provide the first content and the second content to a higher level layer of the content reception device from a lower level layer of the content reception device. In this example, an order of the first content and the second content may be changed in the higher level layer of the content reception device.

For example, the content reception device may change the order of the first content and the second content based on time indicators including time information for each of the first content and the second content, and based on hierarchical names of each of the first content and the second content.

An example of correcting an order of content using the second scheme is described with reference to FIG. 9.

Figure 5:
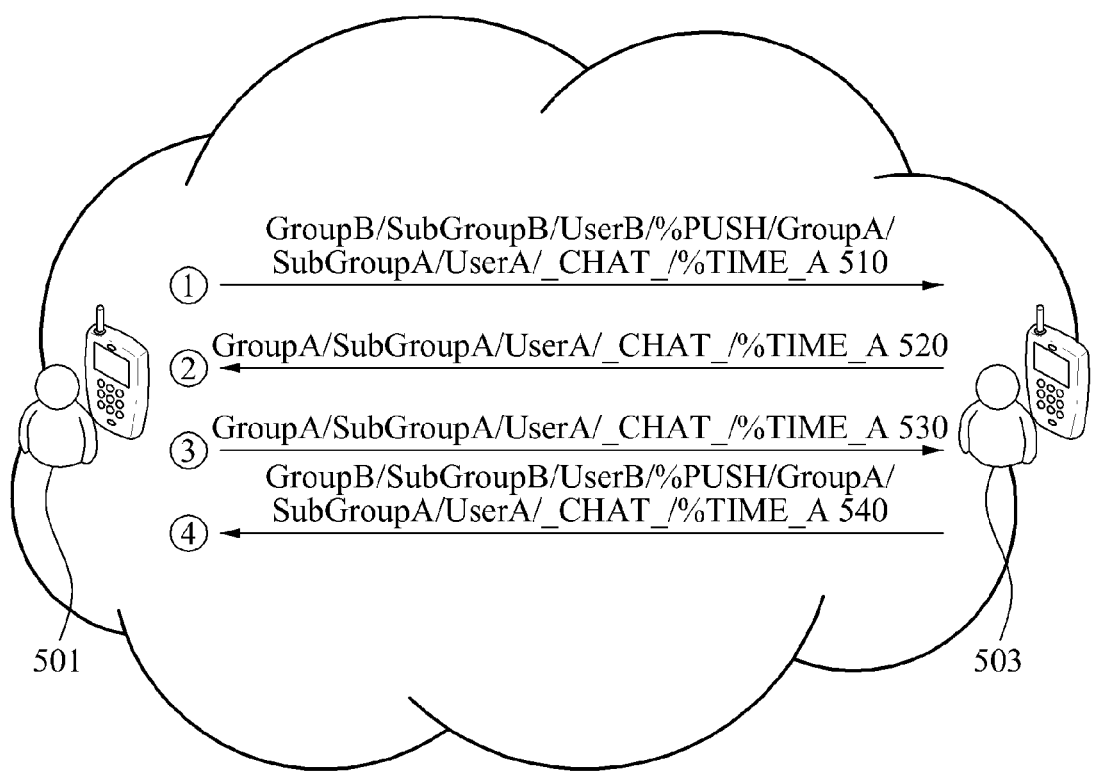
FIG. 5 is a diagram illustrating an example of transmitting sequential content using various indicators between a content transmission device and a content reception device in a CCN.

FIG. 5 illustrates an example of transmitting sequential content using various indicators between a content transmission device and a content reception device in a CCN.

In this example, a content transmission device 501 corresponds to a terminal of User A included in SubGroup A of Group A, and a content reception device 503 corresponds to a terminal of User B included in SubGroup B of Group B.

A name of content used to deliver content in the CCN may be known. Thus, in this example a scheme may be used to add, to a hierarchical name of sequential content, an indicator indicating that the corresponding content is sequential content and a time indicator including time information.

An example of a hierarchical name of sequential content generated by the content transmission device 501 is as (1) shown below.

GroupA/SubGroupA/UserA/_CHAT_/%TIME_A       (1)

In this example, "GroupA/SubGroupA/UserA" is a prefix of a content name, and may correspond to information about an organization or a group including a user corresponding to the content transmission device 501, information about a user, and the like.

Thus, the hierarchical name shown in (1) indicates that a generator corresponding to the content transmission device 501 generating sequential content is UserA included in SubGroupA of GroupA.

The hierarchical name of sequential content may further include a file name of sequential content, for example, abc.doc, and the like, information about an attribute of at least one sequential content, and the like.

The content transmission device 501 may add, to the hierarchical name, an indicator "_CHAT_" indicating that the corresponding content is sequential content and time indicator "_/%TIME_A" including time information "A" of the sequential content. The time information "A" of sequential content may correspond to a point in time when the corresponding content is generated, or may correspond to an order of the corresponding content.

The content transmission device 501 may generate a push request message by adding, to a hierarchical name of the sequential content, for example, GroupA/SubGroupA/UserA/_CHAT_/%TIME_A, and information about a content reception device to receive the push request message, for example, GroupB/SubGroupB/UserB. In this example, the content transmission device 501 may inform the content reception device 503 about a push request using an indicator for a push request. For example, an indicator "%PUSH" may inform the content reception device 503 that content is to be transmitted based on a push scheme.

An example of form of a generated push request message (or push request interest) is as (2) shown below.

GroupB/SubGroupB/UserB/%PUSH/GroupA/Sub-
    GroupA/UserAl_CHAT_/%TIME_A       (2)

In 510, the content transmission device 501 transmits, to the content reception device 503, a push request message in a form of (2) or the like indicating that the content transmission device 501 has sequential content to transmit.

In 520, the content transmission device 501 receives a content request message from the content reception device 503, in response to the push request message.

For example, the content reception device 503 receiving the push request message may recognize, through "_CHAT_," that the content to be transmitted is sequential content, and may request content based on a precise name of sequential content obtained from the push request message.

The content request message may only include a hierarchical name of content the content reception device 503 that requests transmission of from the content transmission device 501. For example, the content request message may have a form of (3) or the like.

$$\text{GroupA/SubGroupA/UserA/\_CHAT\_/\%TIME\_A} \quad (3)$$

In 530, the content transmission device 501 transmits sequential content to the content reception device 503. In this example, the content transmission device 501 may transmit the sequential content along with the hierarchical name of the sequential content. Thus, the sequential content may have a similar form to a form of (3).

In 540, the content reception device 503 transmits a response message such as an OK response to the content transmission device 501, in response to the sequential content. Through the response message, the content transmission device 501 may confirm that the content reception device 503 receives accurate content. The response message corresponding to the OK response may have a form of (4) shown below, which is the same as a form of the afore-mentioned push request message.

$$\text{GroupB/SubGroupB/UserB/\%PUSH/GroupA/Sub-} \\ \text{GroupA/UserA\_CHAT\_/\%TIME\_A} \quad (4)$$

In this example, the push request message having a form of (2) and the content request message having a form of (3) may correspond to an interest, and the sequential content having a form of (3) and the response message having a form of (4) may correspond to content.

Figure 6:
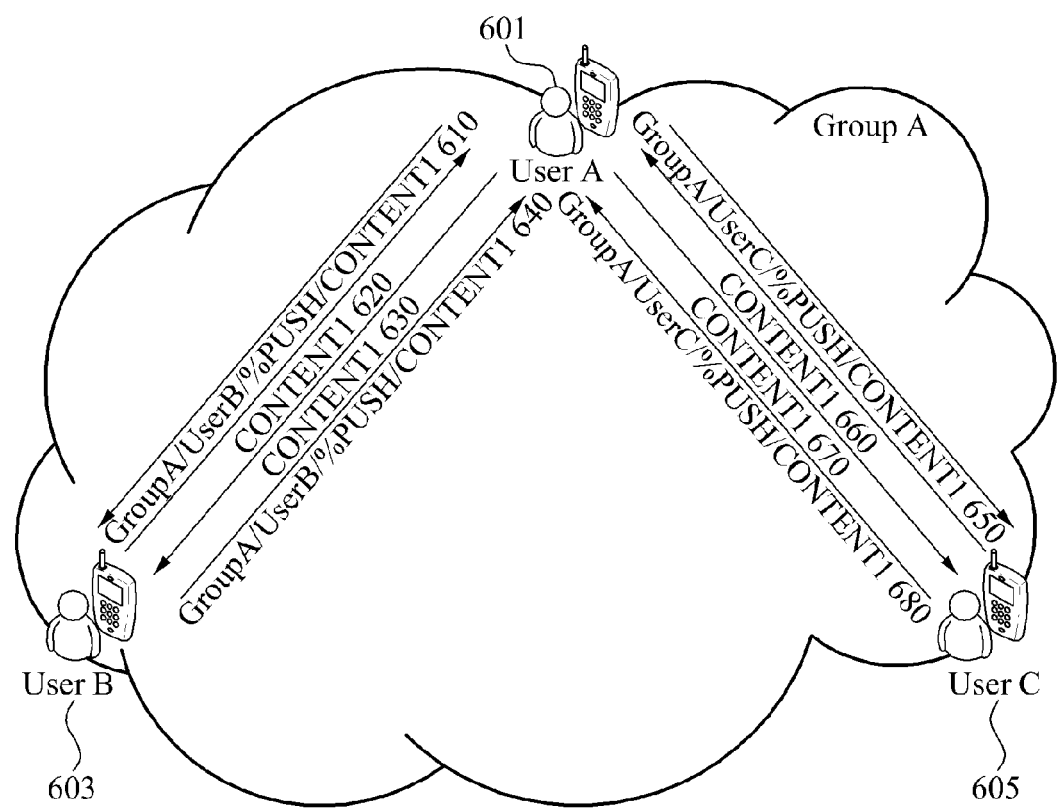
FIG. 6 is a diagram illustrating an example of transmitting sequential content using various indicators among several devices in a CCN.

FIG. 6 illustrates an example of transmitting sequential content using various indicators among several devices in a CCN.

It should be appreciated that the method of transmitting sequential content described in the foregoing may be applied between multiple content transmission devices and multiple content reception devices.

For example, a User A included in Group A may transmit sequential content using a text chat, and the like to User B and User C included in Group A. In this example, a terminal of User A corresponds to a content transmission device 601, a terminal of User B corresponds to a content reception device 603, and a terminal of User C corresponds to a content reception device 605.

An example of a hierarchical name of sequential content generated by the content transmission device 601 of User A may be denoted by "GroupA/UserA/_CHAT_/%TIME_1" (hereinafter, referred to as "CONTENT1" for ease of description.

The content transmission device 601 may generate a push request message "GroupA/UserB/%PUSH/CONTENT1" using a hierarchical name CONTENT1 of sequential content and an indicator "%PUSH" indicating that sequential content is to be transmitted to the content reception device 603 corresponding to User B of Group A in a push scheme.

In this example, a push request message "GroupA/UserC/%PUSH/CONTENT1" that is to be transmitted to the content reception device 605 corresponding to User C of Group A may be generated in a similar scheme.

In 610 and 650, the content transmission device 601 transmits the generated push request messages to each of the content reception device 603 and the content reception device 605. In response, in 620 and 660, the content transmission device 601 receives a content request message having a hierarchical name of sequential content from each of the content reception device 603 and the content reception device 605.

Thereafter, the content transmission device 601 transmits the sequential content to each of the content reception device 603 and the content reception device 605 in 630 and 670, and receives a response message in response to transmitting of the sequential content in 640 and 680.

A transmission of sequential content between several devices may be performed even if each user belongs to different groups as well as an example in which each user belongs to a single group.

FIG. 7 illustrates an example of sequential content (or data) exchanged between a content transmission device and a content reception device that is received out of order in a transmission in a CCN.

In response to a content transmission device 701 successively transmitting a push request message to a content reception device 703, the content reception device 703 may successively transmit a content request message to the content transmission device 701 in 705, 720, and 730.

The content transmission device 701 may transmit sequential content, for example, Message (1) 710, Message (2) 725, and Message (3) 735 based on an order of the content request message.

In this example, unlike Message (1) 710 arriving at the content reception device 703 in chronological order of a transmission, Message (2) 725 arrives after Message (3) 735, for example, due to an occurrence of a delay resulting from an unstable network, and the like.

When sequential content is received out of order in a transmission, content in a text chat, a voice chat, and the like may not be recognized properly. Accordingly, the content reception device 703 may correct an order of sequential content.

Examples of schemes for correcting an order of received sequential content by the content reception device 703 are described with reference to FIG. 8 and FIG. 9.

Figure 8:
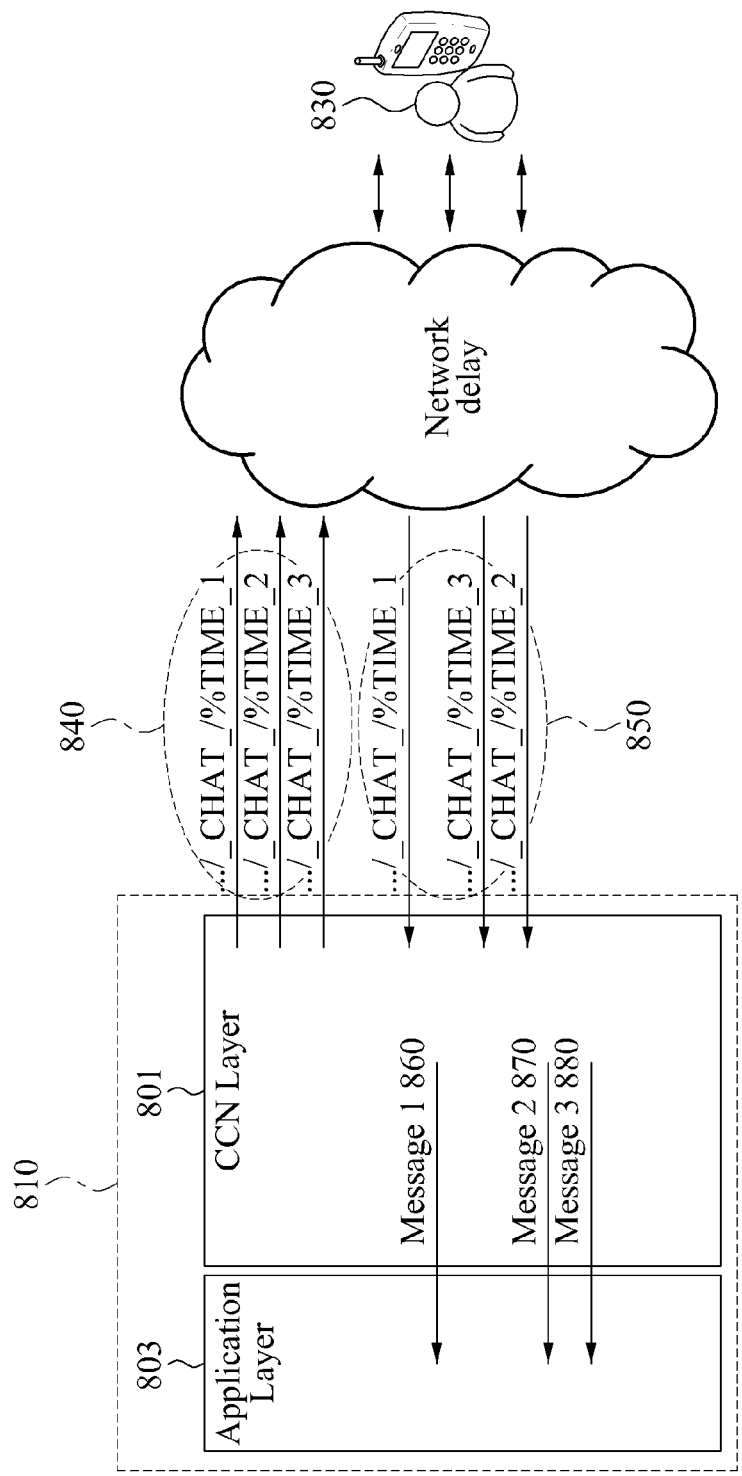
FIG. 8 is a diagram illustrating an example of a scheme of correcting an order of sequential content in a lower level layer of a content reception device in a CCN.

FIG. 8 illustrates an example of a scheme of correcting an order of sequential content in a lower level layer of a content reception device.

In response to a delay occurring in a network, a message, a packet, and the like may be delivered out of order in a transmission as illustrated in FIG. 7. The disorder may be resolved using a time indicator that includes time information.

A content transmission device 830 may transmit, to a content reception device 810, a push request message indicating that sequential content is to be transmitted. For example, each of an indicator "_CHAT_" indicating the corresponding content is sequential content and a time indicator %TIME_1, %TIME_2, or %TIME_3 including time information of sequential content may be inserted into a hierarchical name of sequential content that is included in the push request message.

In response to the push request message of the content transmission device 830, the content reception device 810 may transmit a content request message 840 to the content transmission device 830.

For example, the content request message 840 may have the hierarchical name of sequential content into which the indicator "_CHAT_" indicating the corresponding content is sequential content and the time indicator %TIME_1, %TIME_2, or %TIME_3 including time information of sequential content are successively inserted.

The content transmission device 830 may transmit, to the content reception device 810, sequential content 850 including Message (1) 860, Message (2) 870, and Message (3) 880. In this example, unlike Message (1) 860 received in chronological order of a transmission, Message (2) 870 and Message (3) 880 are received out of order in a transmission.

The content reception device 810 may recognize that Message (2) 870 and Message (3) 880 are received out of order in a transmission and may change an order of each of Message (2) 870 and Message (3) 880 in a lower level layer 801 using time indicators %TIME_2 and %TIME_3 inserted into the hierarchical name of sequential content.

For example, if a message having a time indicator %TIME_3 is received prior to a message having a time indicator %TIME_2 after a reception of a message having a time indicator %TIME_1, a lower level layer 801 of the content reception device 810 may recognize the message having the time indicator %TIME_2 transmitted after the message having the time indicator %TIME_1 is delayed.

In this example, the lower level layer 801 may await reception of the message having the time indicator %TIME_2. In response to the message having the time indicator %TIME_2 being received, the content reception device 810 may change an order of the message having the time indicator %TIME_3 and the message having the time indicator %TIME_2 which are received out of order in a transmission. Thereafter, the lower level layer 801 may provide a higher level layer 803 with Message (2) 870 and Message (3) 880 having an order that is changed.

For example, the lower level layer 801 may correspond to a CCN layer or a higher layer of the CCN layer, and the higher level layer 803 may correspond to an application layer.

Figure 9:
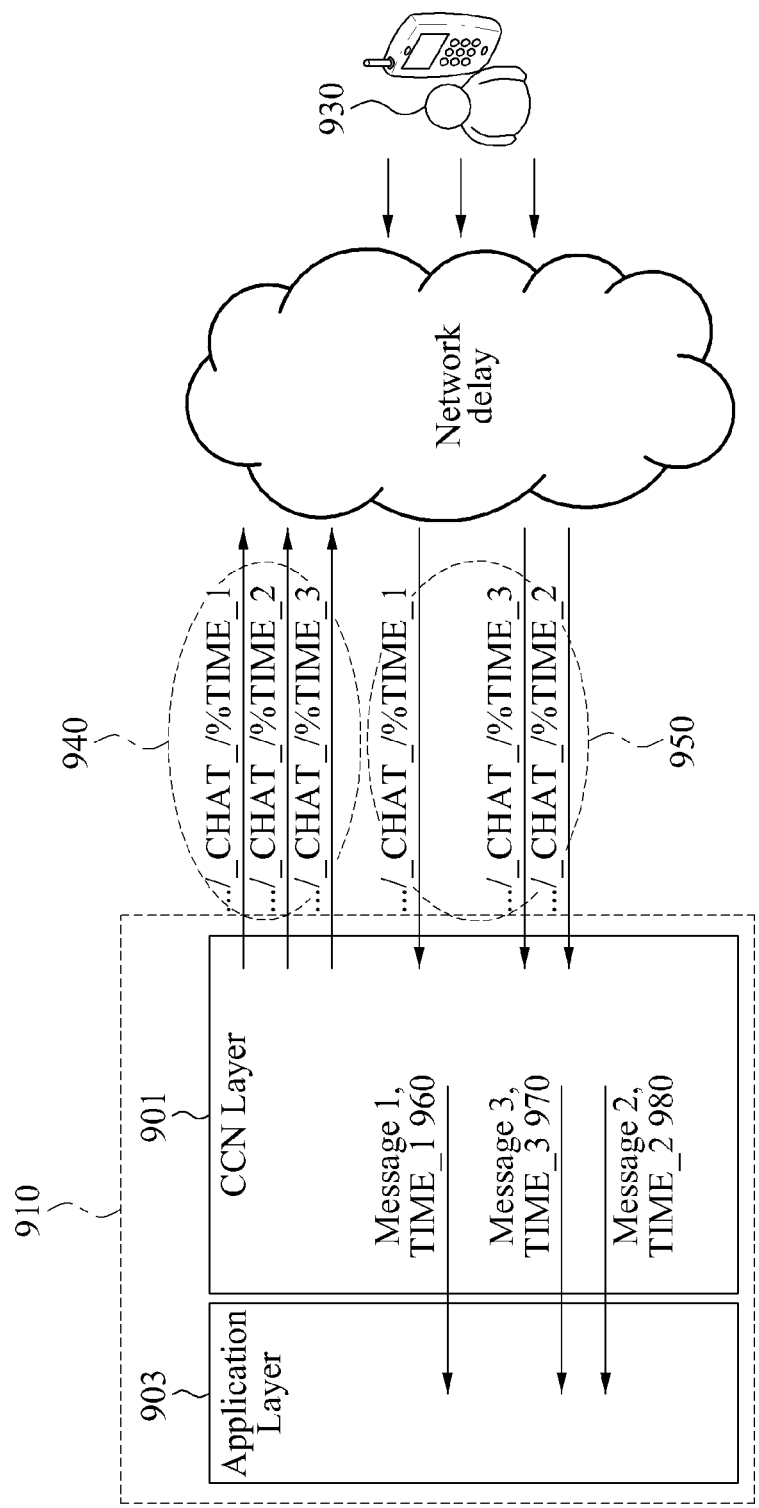
FIG. 9 is a diagram illustrating an example of a scheme of correcting an order of sequential content in a higher level layer of a content reception device in a CCN.

FIG. 9 illustrates an example of a scheme of correcting an order of sequential content in a higher level layer of a content reception device in a CCN.

Similar to a case of FIG. 8, a content transmission device 930 may transmit, to a content reception device 910, a push request message indicating that sequential content is to be transmitted. In response to the push request message of the content transmission device 930, the content reception device 910 may transmit a content request message 940 to the content transmission device 930.

Thereafter, the content transmission device 930 may transmit, to the content reception device 910, sequential content 950 including Message (1) 960, Message (2) 970, and Message (3) 980. In this example, unlike Message (1) 960 received in chronological order of a transmission, Message (3) 970 and Message (2) 980 are received out of order in a transmission.

In this example, unlike the case of FIG. 8, a lower level layer 901 of the content reception device 910 may provide Message (3) 970 and Message (2) 980 to a higher level layer 903 without changing an order of Message (3) 970 and Message (2) 980. Accordingly, the higher level layer 903 may correct the order using a time indicator inserted into a hierarchical name of sequential content.

Figure 10:
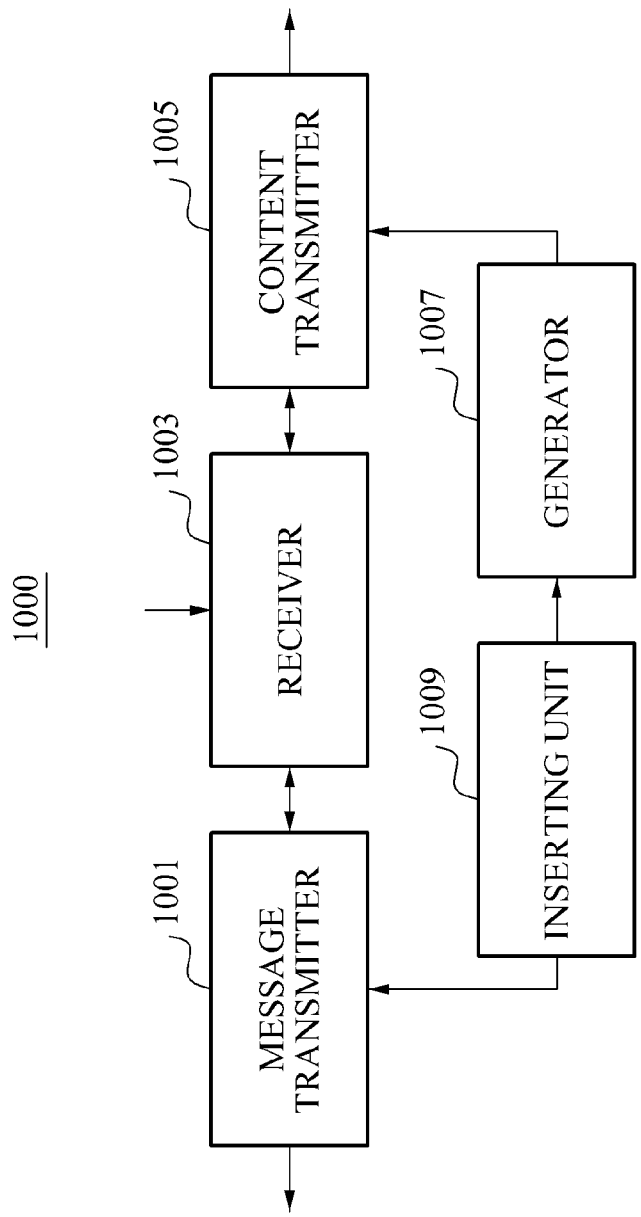
FIG. 10 is a diagram illustrating an example of a content transmission device.

FIG. 10 illustrates an example of a content transmission device.

Referring to FIG. 10, content transmission device 1000 includes a message transmitter 1001, a receiver 1003, and a content transmitter 1005. The content transmission device 1000 may further include a generator 1007, and an inserting unit 1009.

The message transmitter 1001 may transmit at least one push request message to at least one content reception device. For example, the at least one push request message may include an indicator indicating that content is to be transmitted to the at least one content reception device based on a push scheme.

The receiver 1003 may receive, from the at least one content reception device, at least one content request message requesting the at least one sequential content in response to the at least one push request message. The receiver 1003 may receive at least one response message from the at least one content reception device, in response to the at least one sequential content.

The content transmitter 1005 may transmit the at least one sequential content to the at least one content reception device.

The generator 1007 may generate a hierarchical name of the at least one sequential content. For example, the hierarchical name of the at least one sequential content may include at least one of information about a group including a content transmission device generating the at least one sequential content, a file name of the at least one sequential content, and information about an attribute of the at least one sequential content.

The inserting unit 1009 may insert, into the hierarchical name of the at least one sequential content, an indicator indicating that at least one content that is to be transmitted to the at least one content reception device, corresponds to sequential content.

The inserting unit 1009 may insert, into the hierarchical name of the at least one sequential content, a time indicator including time information of the at least one sequential content.

FIG. 11 illustrates an example of a content reception device.

Referring to FIG. 11, content reception device 1100 includes a message receiver 1101, a transmitter 1103, and a content receiver 1105. The content reception device 1100 may further include a verification unit 1107, a provider 1109, and a changing unit 1111.

The message receiver 1101 may receive, from at least one content transmission device, at least one push request message including an indicator indicating that content is to be transmitted based on a push scheme.

The transmitter 1103 may transmit at least one content request message requesting sequential content in response to the at least one push request message.

The content receiver 1105 may receive at least one sequential content from the at least one content transmission device. For example, the at least one sequential content may have a hierarchical name including at least one of information about a group including a content transmission device generating the at least one sequential content, a file name of the at least one sequential content, and information about an attribute of the at least one sequential content.

For example, if the at least one sequential content includes a first content and a second content, the verification unit 1107 may verify whether each of the first content and the second content is received in chronological order in a transmission.

In this example, if the first content and the second content are received out of order in a transmission as a result of verification in the verification unit 1107, the provider 1109 may provide the first content and the second content to a higher level layer of the content reception device 1100 from a lower level layer of the content reception device 1100.

The changing unit 1111 may change an order of the first content and the second content in the higher level layer of the content reception device 1100.

For example, the changing unit 1111 may change the order of the first content and the second content based on time indicators including time information of each of the first content and the second content, and based on hierarchical names of each of the first content and the second content.

As described in various examples herein, by transmitting sequential content using a push scheme, a load of a network and inefficiency of a transmission due to a constant transmission of a content request message between devices may be reduced.

As described in various examples herein, by inserting, into a hierarchical name of sequential content, an indicator indicating that content is to be transmitted based on a push scheme during a transmission of sequential content, a content reception device may more easily recognize that content is transmitted based on a push scheme.

As described in various examples herein, by inserting, into a hierarchical name of sequential content, an indicator indicating that content is to be transmitted based on a push scheme during a transmission of sequential content, a content reception device may more easily recognize the corresponding content is sequential content.

As described in various examples herein, by inserting, into a name of sequential content, a time indicator including time information during a transmission of sequential content, sequential content may be received in chronological order of a transmission.

Program instructions to perform a method described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more non-transitory computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of receiving sequential content by a content reception device in a content centric network (CCN), the method comprising:
   receiving, from a content transmission device, at least one push request message comprising an indicator indicating that content is to be transmitted based on a push scheme;
   transmitting at least one content request message requesting the sequential content, in response to the at least one push request message; and
   receiving the sequential content from the content transmission device,
   wherein the at least one push request message is created by:
      generating a hierarchical name of the sequential content,
      generating a time indicator comprising time information of the sequential content, and
      inserting the generated hierarchical name and the time indicator into the at least one push request message.

2. The method of claim 1, further comprising:
   verifying whether a first content and a second content of the sequential content are received in chronological order of a transmission.

3. The method of claim 2, further comprising:
   changing an order of the first content and the second content in a lower level layer of the content reception device, in response to the first content and the second content being received out of order in the transmission; and
   providing the first content and the second content having a changed order to a higher level layer of the content reception device.

4. The method of claim 3, wherein the changing comprises:
   changing the order of the first content and the second content based on time indicators comprising time information of each of the first content and the second content, and based on hierarchical names of each of the first content and the second content.

5. The method of claim 2, further comprising:
   providing the first content and the second content to a higher level layer of the content reception device from a lower level layer of the content reception device, in response to the first content and the second content being received out of order in the transmission; and
   changing an order of the first content and the second content in the higher level layer of the content reception device.

6. The method of claim 5, wherein the changing comprises:
   changing the order of the first content and the second content based on time indicators comprising time information of each of the first content and the second content, and based on hierarchical names of each of the first content and the second content.

7. The method of claim 1, wherein the hierarchical name includes at least one of information about a group including a content transmission device generating the sequential content, a file name of the sequential content, and information about an attribute of the sequential content.

8. The method of claim 1, further comprising generating the at least one content request message using the hierarchical name of the sequential content.

9. A method of transmitting sequential content by a content transmission device in a content centric network (CCN), the method comprising:
   preparing sequential content to be transmitted from the content transmission device to a content reception device;
   generating a hierarchical name of the sequential content;
   generating a time indicator comprising time information of the sequential content; and
   inserting the generated hierarchical name and the time indicator into at least one push request message to be transmitted to the content reception device;
   transmitting, to the content reception device, the at least one push request message comprising an indicator indicating that content is to be transmitted based on a push scheme;

receiving, from the content reception device, at least one content request message requesting the sequential content, in response to the at least one push request message; and transmitting the sequential content to the content reception device.

10. The method of claim 9, further comprising:
generating a sequential content indicator indicating that the content that is to be transmitted to the content reception device includes sequential content; and
inserting the sequential content indicator into the at least one push request message to be transmitted to the content reception device.

11. The method of claim 9, further comprising adding information about the content reception device to the hierarchical name of the sequential content.

12. The method of claim 9, wherein the hierarchical name of the sequential content comprises at least one of information about a group including a content transmission device generating the sequential content, a file name of the sequential content, and information about an attribute of the sequential content.

13. The method of claim 9, further comprising:
receiving, from the content reception device, a response message corresponding to a response to the transmitted sequential content.

14. A non-transitory computer-readable storage medium having stored therein program instructions to cause a processor to implement a method of transmitting sequential content by a content transmission device in a content centric network (CCN), the method comprising:
preparing sequential content to be transmitted from the content transmission device to a content reception device;
generating a hierarchical name of the sequential content;
generating a time indicator comprising time information of the sequential content; and
inserting the generated hierarchical name and the time indicator into at least one push request message to be transmitted to the content reception device;
transmitting, to the content reception device, the at least one push request message comprising an indicator indicating that content is to be transmitted based on a push scheme;
receiving, from the content reception device, at least one content request message requesting the sequential content, in response to the at least one push request message; and
transmitting the sequential content to the content reception device.

15. A content transmission device in a content centric network (CCN), the content transmission device comprising:
a generator configured to generate a hierarchical name of sequential content and a time indicator comprising time information of the sequential content;
an inserting unit to insert the generated hierarchical name and the time indicator into at least one push request message;
a message transmitter configured to transmit, to a content reception device, the at least one push request message comprising an indicator indicating that content is to be transmitted based on a push scheme;
a receiver configured to receive, from the content reception device, at least one content request message requesting the sequential content, in response to the at least one push request message; and
a content transmitter configured to transmit the sequential content to the content reception device.

16. A content reception device in a content centric network (CCN), the content reception device comprising:
a message receiver configured to receive, from a content transmission device, at least one push request message comprising an indicator indicating that content is to be transmitted based on a push scheme;
a transmitter configured to transmit at least one content request message requesting sequential content, in response to the at least one push request message; and
a content receiver configured to receive the sequential content from the content transmission device,
wherein the at least one push request message is created by:
generating a hierarchical name of the sequential content,
generating a time indicator comprising time information of the sequential content, and
inserting the generated hierarchical name and the time indicator into the at least one push request message.

\* \* \* \* \*